(12) United States Patent
Rook

(10) Patent No.: US 9,995,353 B2
(45) Date of Patent: Jun. 12, 2018

(54) MODIFIED ACTUATOR DESIGN TO IMPROVE LOAD DISTRIBUTION AND DAMPING

(71) Applicant: Goodrich Corporation, Charlotte, NC (US)

(72) Inventor: Todd Rook, Tipp City, OH (US)

(73) Assignee: Goodrich Corporation, Charlotte, NC (US)

( * ) Notice: Subject to any disclaimer, the term of this patent is extended or adjusted under 35 U.S.C. 154(b) by 127 days.

(21) Appl. No.: 14/976,923

(22) Filed: Dec. 21, 2015

(65) Prior Publication Data

US 2017/0175831 A1   Jun. 22, 2017

(51) Int. Cl.
F16D 55/00 (2006.01)
F16D 65/00 (2006.01)
F16D 55/24 (2006.01)

(52) U.S. Cl.
CPC ......... *F16D 65/0006* (2013.01); *F16D 55/24* (2013.01); *F16D 2200/0052* (2013.01)

(58) Field of Classification Search
CPC .......... F16D 55/24; F16D 55/38; F16D 55/44; F16D 55/36; F16D 65/0006; F16D 65/183; F16D 65/186; F16D 2055/0058; F16D 2055/0091; F16D 2200/0052; F16D 2121/24
USPC ............................................. 188/73.2, 73.37
See application file for complete search history.

(56) References Cited

U.S. PATENT DOCUMENTS

| | | | |
|---|---|---|---|
| 2,888,103 A | 5/1959 | Armstrong | |
| 4,676,668 A * | 6/1987 | Ide | F16C 17/03 384/117 |
| 5,499,705 A | 3/1996 | Ide | |
| 5,520,267 A | 5/1996 | Giering et al. | |
| 5,971,111 A * | 10/1999 | Maxwell | F16D 55/40 188/71.5 |
| 6,095,293 A * | 8/2000 | Brundrett | F16D 55/36 188/18 A |
| 6,286,634 B2 * | 9/2001 | Niespodziany | F16D 55/36 188/71.5 |
| 6,581,730 B1 * | 6/2003 | Haydon | B60T 1/065 188/18 A |
| 7,156,212 B1 | 1/2007 | Ciotti | |
| 7,614,340 B2 | 10/2009 | Steinke | |

(Continued)

FOREIGN PATENT DOCUMENTS

| | | |
|---|---|---|
| CA | 2950455 | 12/2015 |
| EP | 1533536 | 5/2005 |

(Continued)

OTHER PUBLICATIONS

Extended European Search Report dated May 23, 2017 in European Application No. 16205491.0.

*Primary Examiner* — Thomas W Irvin
(74) *Attorney, Agent, or Firm* — Snell & Wilmer L.L.P.

(57) ABSTRACT

The present disclosure provides systems for mitigating brake vibration. In various embodiments, a brake force distribution arrangement may comprise: a member in operable communication with an actuator having at least two contact surfaces such that as one of the at least two contact surfaces moves in a direction of actuation of the actuator the other moves in a direction opposite to the direction of actuation of the actuator.

17 Claims, 3 Drawing Sheets

(56) References Cited

U.S. PATENT DOCUMENTS

| | | | | |
|---|---|---|---|---|
| 7,717,240 B2* | 5/2010 | Anderson | B60T 13/741 | |
| | | | 188/156 | |
| 8,037,971 B2* | 10/2011 | Chico | F16D 55/36 | |
| | | | 188/18 A | |
| 8,296,916 B2* | 10/2012 | Kipp | F16D 65/0043 | |
| | | | 29/402.03 | |
| 8,319,384 B2* | 11/2012 | Hanlon | F16D 65/14 | |
| | | | 310/76 | |
| 8,839,918 B2* | 9/2014 | Thibault | H02K 7/06 | |
| | | | 188/156 | |
| 8,997,946 B2* | 4/2015 | Haydon | F16D 55/36 | |
| | | | 188/72.7 | |
| 9,004,233 B2* | 4/2015 | Drennen | F16D 55/36 | |
| | | | 188/1.11 E | |
| 9,187,172 B2* | 11/2015 | Tanty | B64C 25/42 | |
| 9,534,971 B2* | 1/2017 | Singh | G01L 5/225 | |
| 9,593,726 B2* | 3/2017 | Chambard | F16D 55/42 | |
| 2003/0024776 A1* | 2/2003 | Severinsson | B60T 13/741 | |
| | | | 188/72.1 | |
| 2004/0245053 A1* | 12/2004 | Chico | B60T 13/74 | |
| | | | 188/71.5 | |
| 2005/0056499 A1* | 3/2005 | Narcy | F16D 55/36 | |
| | | | 188/71.6 | |
| 2006/0175897 A1* | 8/2006 | Ether | B60T 13/741 | |
| | | | 303/138 | |
| 2008/0135349 A1* | 6/2008 | Himes | F16D 65/0043 | |
| | | | 188/71.5 | |
| 2009/0120739 A1* | 5/2009 | Corio | F16D 65/0043 | |
| | | | 188/73.32 | |
| 2010/0276233 A1* | 11/2010 | Cahill | B60T 13/741 | |
| | | | 188/73.47 | |
| 2012/0153753 A1* | 6/2012 | Hanlon | F16D 65/14 | |
| | | | 310/77 | |
| 2013/0299286 A1* | 11/2013 | Tanty | B64C 25/42 | |
| | | | 188/71.5 | |
| 2016/0108978 A1* | 4/2016 | Adams | F16D 65/0006 | |
| | | | 188/264 G | |

FOREIGN PATENT DOCUMENTS

| | | |
|---|---|---|
| GB | 830286 | 3/1960 |
| WO | 9850711 | 11/1998 |

* cited by examiner

MODIFIED ACTUATOR DESIGN TO IMPROVE LOAD DISTRIBUTION AND DAMPING

FIELD

The present disclosure relates to aircraft braking systems, and more specifically, to systems and methods for control over a plurality of electro-mechanical actuators with at least one load cell.

BACKGROUND

Typically, an aircraft may comprise a plurality of electro-mechanical brake actuators (EBAs) that are configured to apply force to a brake stack on an aircraft wheel. Uneven loading of the brake stack during brake actuation may cause vibration.

SUMMARY

Systems are provided herein for mitigating brake vibration. A brake force distribution arrangement may comprise: a member in operable communication with an actuator having at least two contact surfaces such that as one of the at least two contact surfaces moves in a direction of actuation of the actuator the other moves in a direction opposite to the direction of actuation of the actuator.

In various embodiments, the member may extend from a first end to a second end. The at least two contact surfaces may comprise a first contact surface and a second contact surface. The first contact surface may comprise a first boss and the second contact surface may comprise a second boss, the first boss and the second boss extending from the member. The first contact surface may be located proximate the first end of the member and the second contact surface may be located proximate the second end of the member. The member may include an attachment feature located between the first end and the second end of the member, the member configured to pivot about the attachment feature. The attachment feature may be configured to be coupled to a ball screw. The attachment feature may be located closer to the first end than the second end.

A brake arrangement may comprise: an actuator plate; an actuator coupled to the actuator plate, the actuator including a ball screw extending from the actuator; and a member including a first contact surface extending from the member in close proximity to a first end of the member, a second contact surface extending from the member in close proximity to a second end of the member, and an attachment feature located between the first end and the second end, the member coupled to the ball screw via the attachment feature.

In various embodiments, the brake arrangement may further comprise a pressure plate. The first contact surface and the second contact surface may be configured to contact the pressure plate to apply a force to the brake arrangement. The first contact surface and the second contact surface may comprise at least one of a circular, rectangular, or elliptical geometry. The member may comprise a supporting plate defining a circular arc. The member may comprise at least one of a carbon/carbon material or a metal alloy, metal matrix composite (MMC), a medium carbon steel, a high carbon steel, or a composite ceramic. The member may be configured to pivot about the attachment feature. The member may comprise a flexural plate. The member may be configured to evenly distribute the first contact surface and the second contact surface about the actuator plate.

A member for a brake arrangement may comprise: a first contact surface extending from a first end of the member; a second contact surface extending from a second end of the member, the member extending from the first end to the second end and comprising a circular arc, wherein an arc length of the member is between 5% and 35% of a circumference of an adjacent pressure member and an aspect ratio of the member is between 2 and 20; and an attachment feature located between the first end and the second end of the member, wherein the attachment feature is configured to be coupled to a ball screw.

In various embodiments, the arc length of the member may be between 10% and 25% of the circumference of the adjacent pressure plate. A depth of the first contact surface and the second contact surface may be between 10% and 200% of a depth of the member. A width of the first contact surface and the second contact surface may be between 90% and 110% of a width of the member.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein. Thus, the detailed description herein is presented for purposes of illustration only and not of limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step.

While described in the context of aircraft applications, and more specifically, in the context of brake control, the various embodiments of the present disclosure may be applied to any suitable application.

Figure 1:
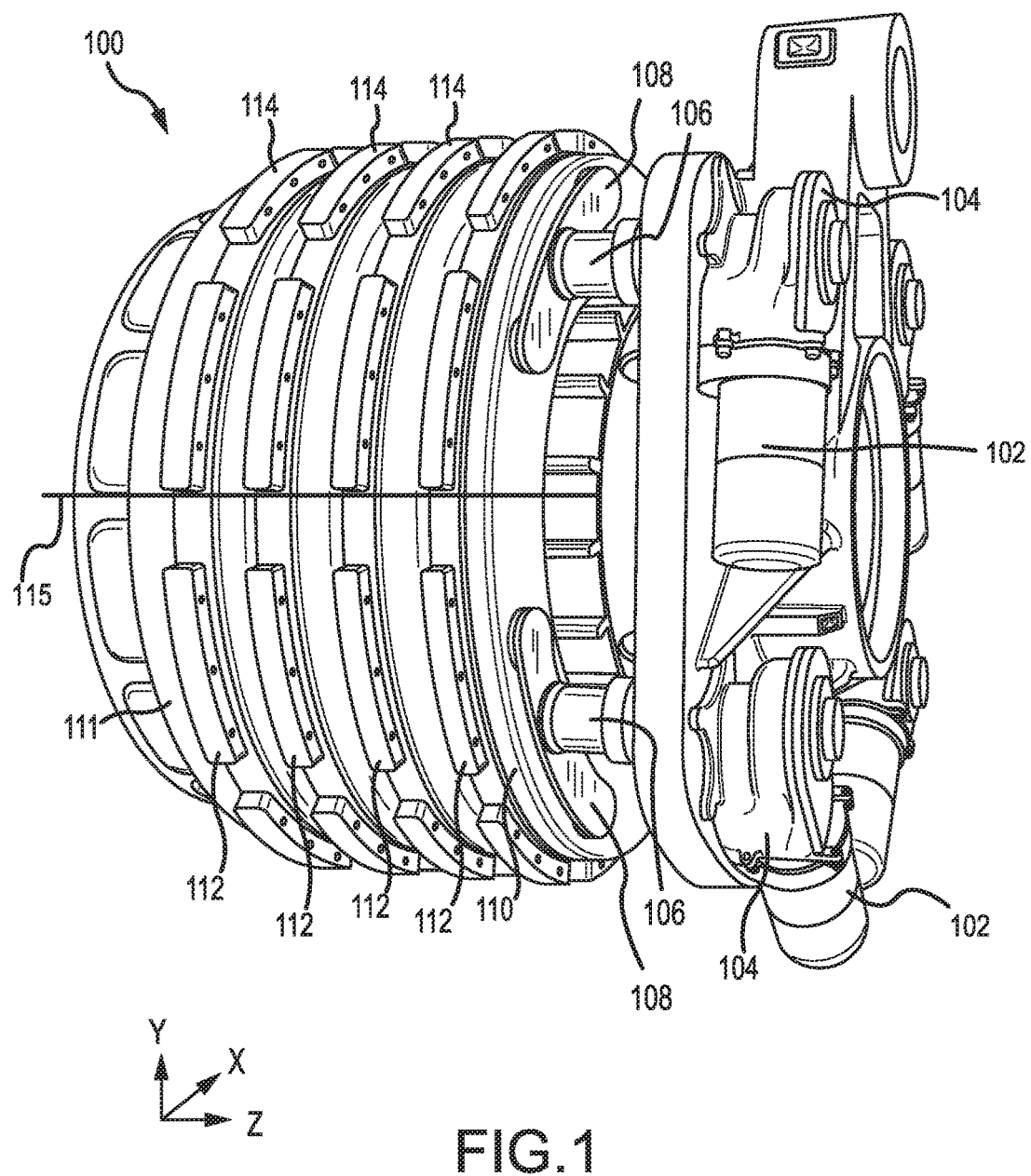
FIG. 1 illustrates an aircraft brake in accordance with various embodiments.

FIG. 1 illustrates an aircraft brake arrangement 100 in accordance with various embodiments. Aircraft brake arrangement 100 may include a plurality of actuator motors 102, a plurality of electromechanical brake actuators 104, a plurality of ball screws 106, an end plate 111 and a pressure plate 110, and a plurality of rotating discs 112 and stators 114 positioned in an alternating fashion between end plate 111 and pressure plate 110. Rotating discs 112 may rotate about an axis 115 and the stators 114 may have no angular movement relative to axis 115. Wheels may be coupled to rotating discs 112 such that a linear speed of the aircraft is proportional to the angular speed of rotating discs 112. As force is applied to pressure plate 110 towards end plate 111 along the axis 115, rotating discs 112 and stators 114 are forced together in an axial direction. This causes the rotational speed of rotating discs 112 to become reduced (i.e., causes braking effect) due to friction between rotating discs 112, stators 114, end plate 111 and pressure plate 110. In response to sufficient force being exerted on rotating discs 112 via pressure plate 110, the rotating discs 112 will stop rotating.

In order to exert this force onto pressure plate 110, actuator motor 102 may cause electromechanical brake actuator 104 to actuate. Although referred to herein as electromechanical brake actuator 104, it is contemplated that, in various embodiments, electromechanical brake actuator 104 may be an electrohydraulic actuator or a hydraulic actuator. In various embodiments, actuator motor 102 may be a brushless motor, such as a permanent magnet synchronous motor (PMSM), a permanent-magnet motor (PMM) or the like. In various embodiments, electromechanical brake actuator 104 may be coupled to or otherwise operate a motor shaft and a pressure generating device, such as, for example, a ball screw, a ram, and/or the like. In response to actuation, electromechanical brake actuator 104 causes the motor shaft to rotate. Rotation of the motor shaft may cause rotation of a ball nut, and rotational motion of the ball nut may be transformed into linear motion of a ball screw 106. Linear translation of ball screw 106 towards pressure plate 110 applies force via member (also referred to herein as a supporting plate) 108 on pressure plate 110 towards end plate 111. Thus, ball screw 106 may extend from brake actuator 104. Accordingly, supporting plate 108 may be in operable communication with actuator 104. Supporting plate 108 may be located adjacent to pressure plate 110.

Pressure plate 110 may comprise a diameter. Pressure plate 110 may comprise a circumference, wherein the circumference is equal to the product of pi (π) and the diameter.

Figure 2:
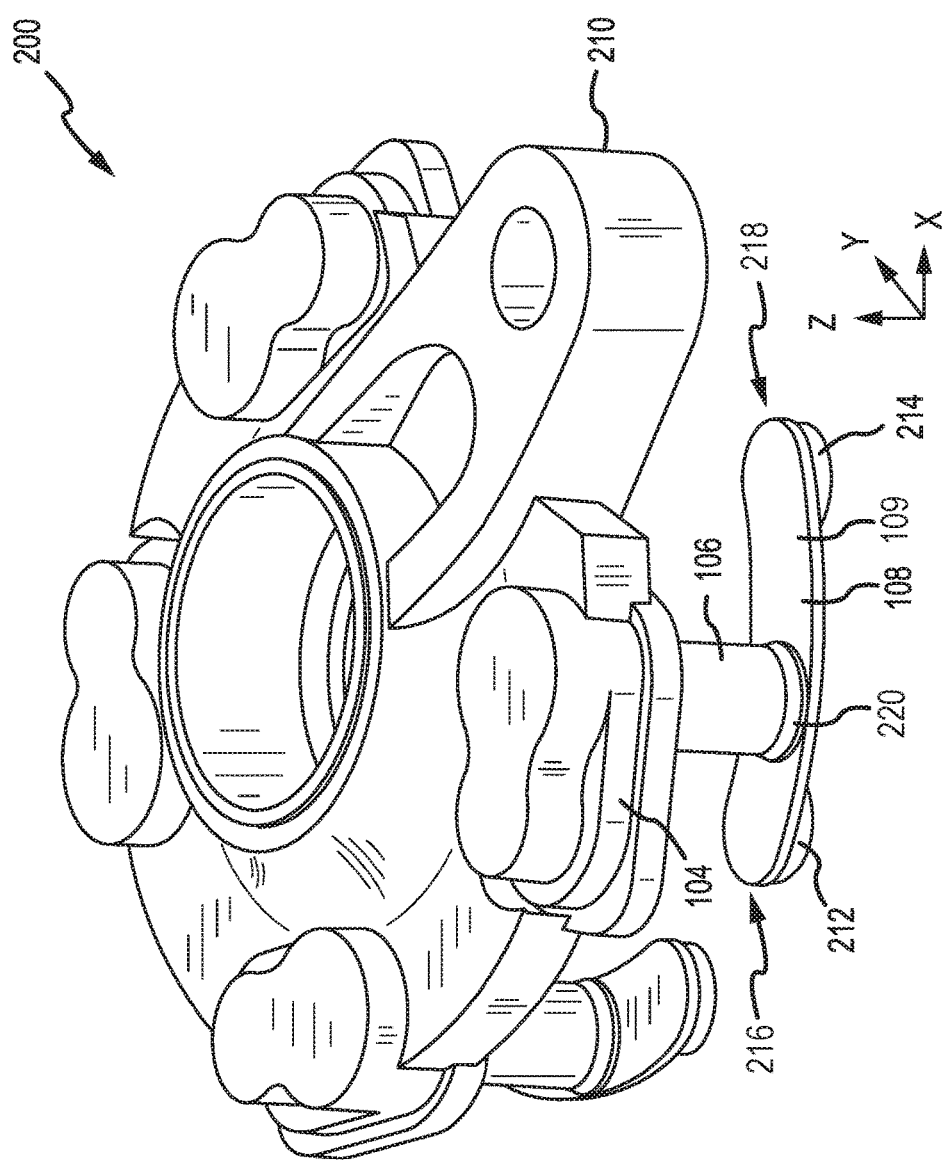
FIG. 2 illustrates a brake actuator plate assembly, in accordance with various embodiments.

With reference to FIG. 2, elements with like element numbering as depicted in FIG. 1 are intended to be the same and will not be repeated for the sake of clarity.

With reference to FIG. 2, brake actuator plate assembly 200 may include actuator plate 210, at least one actuator 104, ball screw 106, and supporting plate 108. In various embodiments, supporting plate 108 may include first contact surface (also referred to herein as first boss) 212 and second contact surface (also referred to herein as second boss) 214. First boss 212 and second boss 214 may extend from supporting plate 108. First boss 212 may be located at first end 216. First boss 212 may be located in close proximity to first end 216. Second boss 214 may be located at second end 218. Second boss 214 may be located in close proximity to second end 218. Supporting plate 108 may comprise a circular arc. Stated another way, supporting plate 108 may define a circular arc. Supporting plate 108 may extend from first end 216 to second end 218.

Supporting plate 108 may include attachment feature 220. In various embodiments, attachment feature 220 may be located between first end 216 and second end 218. Attachment feature 220 may be configured to couple or attach supporting plate 108 to ball screw 106. Attachment feature 220 may comprise a pivot. Attachment feature 220 may be configured to attach to ball screw 106 such that supporting plate 108 may be able to pivot about attachment feature 220. Attachment feature 220 may be configured to attach to ball screw 106 such that supporting plate 108 may be able to pivot about attachment feature 220 in the x-z plane. Attachment feature 220 may be configured to attach to ball screw 106 such that supporting plate 108 may be able to pivot about attachment feature 220 in the y-z plane. Attachment feature 220 may be configured to attach to ball screw 106 such that supporting plate 108 may be able to pivot about attachment feature 220 in any direction similar to the configuration of a ball joint. Supporting plate may pivot about ball screw 106 via attachment feature 220 such that first boss 212 moves in a first direction, such as the positive z-direction for example, and in response to first boss 212 moving in the first direction, second boss moves in a second direction, for example the negative z-direction. In various embodiments, as illustrated in FIG. 2, the positive z-direction may be the direction of actuation of actuator 104 and consequently ball screw 106. In various embodiments, supporting plate 108 may comprise a flexural plate 109. Flexural plate 109 may be a plate which is configured to flex in response to a force exerted from ball screw 106 to pressure plate 110 via flexural plate 109, first boss 212, and/or second boss 214 (see FIG. 1). In various embodiments, supporting plate 108 may be configured to extend and retract with ball screw 106.

In various embodiments, attachment feature 220 may be located at the center of supporting plate 108. Accordingly, attachment feature 220 may be located at an equal distance from first end 216 as it is to second end 218. However, attachment feature 220 may be located at a location other than the center of supporting plate 108. FIG. 2 illustrates second boss 214 located further away from attachment feature 220 than first boss 212. In various embodiments, attachment feature 220 may be located more proximate to first end 216 than second end 218 as illustrated in FIG. 2. Thus, brake actuator plate assembly 200 may be configured to evenly distribute points of contact across pressure plate 110 (see FIG. 1) to compensate for brake actuators 104 that are unevenly distributed or spaced around the circumference of actuator plate 210. Thus, supporting plate 108 may be configured to prevent vibration by evenly distributing points of contact (i.e., first boss 212 and second boss 214) with pressure plate 110 about the circumference of pressure plate 110 (see FIG. 1).

In various embodiments, first boss 212 and second boss 214 may be configured to contact pressure plate 110 to apply a force (braking) to aircraft brake arrangement 100 (see FIG. 1). Supporting plate 108 may comprise a plate. Supporting plate 108 may be flexible such that supporting plate 108 may flex in response to force exerted from pressure plate 110 (see FIG. 1). Accordingly, with momentary reference to FIG. 1, supporting plate 108 may be configured to flex to help evenly distribute forces exerted from pressure plate 110 and/or ball screw 106. For example, first end 216 may be configured to flex away from pressure plate 110 in the positive z-direction in response to a larger force being exerted on first boss 212 than second boss 214. Accordingly, vibration may be dampened in response to supporting plate 108 flexing. Furthermore, supporting plate 108 may be configured to pivot about attachment feature 220 to help evenly distribute forces exerted from pressure plate 110. For example, first end 216 may be configured to pivot away from pressure plate 110 in response to a greater for being exerted on first boss 212 than second boss 214. Accordingly, vibration may be dampened in response to supporting plate 108 pivoting.

Figure 3:
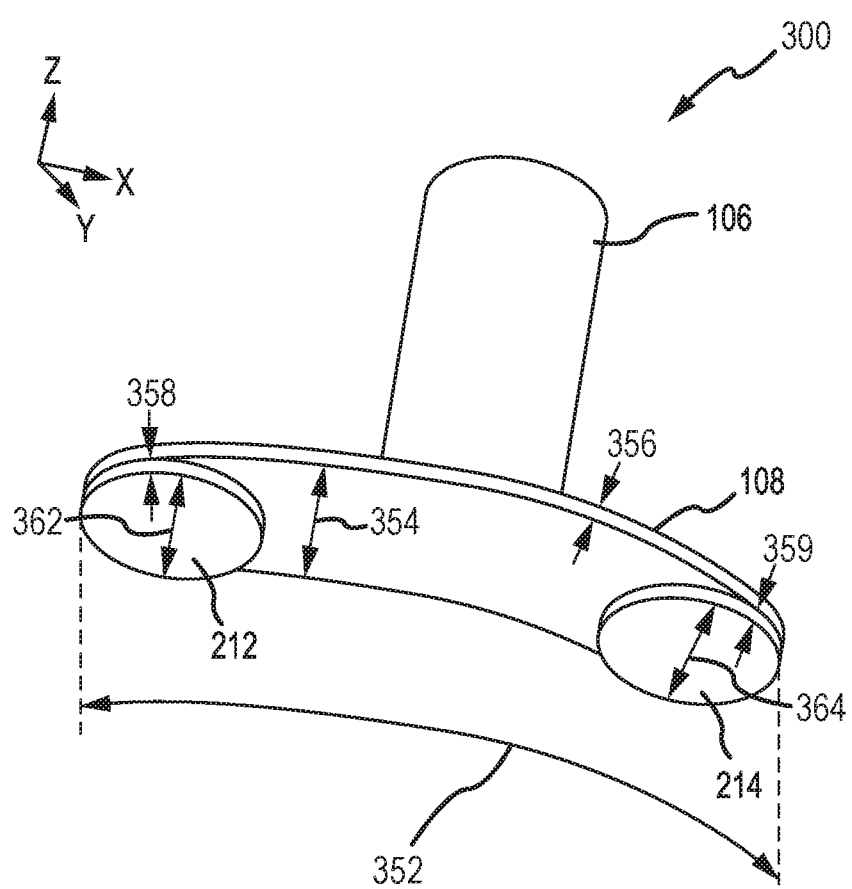
FIG. 3 illustrates a perspective view of a brake force distribution arrangement, in accordance with various embodiments.

With reference to FIG. 3, elements with like element numbering as depicted in FIG. 2 are intended to be the same and will not be repeated for the sake of clarity.

With reference to FIG. 3, a perspective view of a brake force distribution arrangement is illustrated, in accordance with various embodiments. Brake force distribution arrangement 300 may include supporting plate 108 and ball screw 106. First boss 212 and the second boss 214 may comprise a circular geometry as illustrated in FIG. 3. However, first boss 212 and the second boss 214 may comprise a rectangular, elliptical, or any other suitable geometry.

In various embodiments, supporting plate 108, first boss 212, and second boss 214 may be additively manufactured. In various embodiments, supporting plate 108, first boss 212, and second boss 214 may be manufactured via a subtractive manufacturing method. In various embodiments, supporting plate 108, first boss 212, and second boss 214 may comprise a single, unitary member manufactured from a single part. Supporting plate 108 may support first boss 212 and second boss 214. In various embodiments, supporting plate 108, first boss 212, and second boss 214 may comprise carbon/carbon material. Supporting plate 108, first boss 212, and/or second boss 214 may comprise a high heat capacity metal alloy, such as steel, layered steel, or cast iron for example. In various embodiments, supporting plate 108, first boss 212, and second boss 214 may comprise a metal matrix composite (MMC). In various embodiments, supporting plate 108, first boss 212, and second boss 214 may comprise a medium carbon steel. In various embodiments, supporting plate 108, first boss 212, and second boss 214 may comprise a high carbon steel. In various embodiments, supporting plate 108, first boss 212, and second boss 214 may comprise a composite ceramic.

In various embodiments, with temporary reference to FIG. 1, the arc length 352 of supporting plate 108 may be between 5% and 35% of the circumference of pressure plate 110. In various embodiments, the arc length 352 of supporting plate 108 may be between 10% and 25% of the circumference of pressure plate 110.

In various embodiments, supporting plate 108 may comprise an aspect ratio defined by the ratio of the width 354 of supporting plate 108 and the arc length 352 of supporting plate 108. In various embodiments, the aspect ratio of supporting plate 108 may be between 2 and 20. In various embodiments, depth 358 of first boss 212 and depth 359 of second boss 214 may be between 10% and 200% of depth 356 of supporting plate 108. In various embodiments, width 362 of first boss 212 and width 364 of second boss 214 may be between 90% and 110% of width 354 of supporting plate 108.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A brake force distribution arrangement comprising:
   a pressure plate;
   a member in operable communication with an actuator through an attachment feature, the member configured to pivot about the attachment feature in two planes, the member having at least two contact surfaces, each contact surface comprising a boss extending from the member and configured to contact the pressure plate, such that as one of the at least two contact surfaces moves in a direction of actuation of the actuator the other moves in a direction opposite to the direction of actuation of the actuator as the member pivots,
   wherein the at least two contact surfaces are circumferentially spaced apart from each other.

2. The brake force distribution arrangement of claim 1, wherein the member extends from a first end to a second end.

3. The brake force distribution arrangement of claim 1, wherein the first contact surface is located proximate the first end of the member and the second contact surface is located proximate the second end of the member.

4. The brake force distribution arrangement of claim 1, wherein the attachment feature is configured to be coupled to a ball screw.

5. The brake force distribution arrangement of claim 1, wherein the attachment feature is located closer to the first end than the second end.

6. A brake arrangement comprising:
an actuator plate;
an actuator coupled to the actuator plate, the actuator including a ball screw extending from the actuator; and
a member including a first contact surface extending from the member in close proximity to a first end of the member and comprising a first boss, a second contact surface extending from the member in close proximity to a second end of the member and comprising a second boss, the first and second boss configured to contact a pressure plate, and an attachment feature located between the first end and the second end about which the member is configured to pivot in two planes, the member coupled to the ball screw via the attachment feature,
wherein the first contact surface is circumferentially spaced apart from the second contact surface.

7. The brake arrangement of claim 6, wherein the first boss and the second boss are configured to contact the pressure plate to apply a force to the brake arrangement.

8. The brake arrangement of claim 6, wherein the first boss and the second boss comprise at least one of a circular, rectangular, or elliptical geometry.

9. The brake arrangement of claim 6, wherein the member comprises a supporting plate defining a circular arc.

10. The brake arrangement of claim 6, wherein the member comprises at least one of a carbon/carbon material or a metal alloy, metal matrix composite (MMC), a medium carbon steel, a high carbon steel, or a composite ceramic.

11. The brake arrangement of claim 6, wherein the member comprises a flexural plate.

12. The brake arrangement of claim 6, wherein the member is configured to evenly distribute the first contact surface and the second contact surface about the actuator plate.

13. A member for a brake arrangement comprising:
a first contact surface extending from a first end of the member and comprising a first boss;
a second contact surface extending from a second end of the member and comprising a second boss, the first and second boss configured to contact a pressure plate, the member extending from the first end to the second end and comprising a circular arc, wherein an arc length of the member is between 5% and 35% of a circumference of an adjacent pressure plate and an aspect ratio of the plate is between 2 and 20; and
an attachment feature located between the first end and the second end of the member, wherein the member is configured to pivot about the attachment feature in two planes, and the attachment feature is configured to be coupled to a ball screw,
wherein the first contact surface is circumferentially spaced apart from the second contact surface.

14. The member for a brake arrangement of claim 13, wherein the arc length of the member is between 10% and 25% of the circumference of the adjacent pressure plate.

15. The member for a brake arrangement of claim 13, wherein a depth of the first boss and the second boss is between 10% and 200% of a depth of the plate.

16. The member for a brake arrangement of claim 13, wherein a width of the first boss and the second boss is between 90% and 110% of a width of the member.

17. A brake force distribution arrangement comprising:
a pressure plate;
a member in operable communication with an actuator through an attachment feature, the member configured to pivot about the attachment feature in two planes, the member having at least two contact surfaces, each contact surface comprising a boss extending from the member and configured to contact the pressure plate, such that as one of the at least two contact surfaces moves in a direction of actuation of the actuator the other moves in a direction opposite to the direction of actuation of the actuator as the member pivots,
wherein the attachment feature is located closer to the first end than the second end.

* * * * *